United States Patent [19]

Horlacher, Jr. et al.

[11] 4,145,194
[45] Mar. 20, 1979

[54] CYLINDRICAL FIBER BED SEPARATOR ELEMENT WITH SIDE-ENTRY INLET DUCT TO CORE OF ELEMENT

[75] Inventors: Walter R. Horlacher, Jr., Des Peres; Jack L. Owens, Harvester, both of Mo.

[73] Assignee: Monsanto Company, St. Louis, Mo.

[21] Appl. No.: 858,133

[22] Filed: Dec. 7, 1977

[51] Int. Cl.² ...................... B01D 46/04; F24C 15/20
[52] U.S. Cl. ......................................... 55/242; 55/476; 55/498; 55/505; 55/DIG. 36; 210/497 R; 126/299 D
[58] Field of Search ................... 55/185–187, 55/242, 418, 476, 498, 500, 505, 528, DIG. 25, DIG. 36, 495, 497, 515; 210/497 R, 497 FB

[56] References Cited

U.S. PATENT DOCUMENTS

| | | | |
|---|---|---|---|
| 2,970,671 | 2/1961 | Warner | 55/242 |
| 3,228,174 | 1/1966 | Perry, Jr. | 55/185 |
| 3,352,778 | 11/1967 | Brink, Jr. et al. | 55/185 |
| 3,540,190 | 11/1970 | Brink, Jr. | 55/97 |
| 3,670,478 | 6/1972 | Welsh et al. | 55/242 |
| 3,763,631 | 10/1973 | Horn et al. | 55/242 |
| 3,807,570 | 4/1974 | Allan | 210/497 |

Primary Examiner—Frank W. Lutter
Assistant Examiner—David L. Lacey
Attorney, Agent, or Firm—Arthur E. Hoffman

[57] ABSTRACT

A filter bed separator for separation of liquid or solid particulates from gas streams and/or for washing of accumulated solids from the filter bed. Each separator contains one or more cylindrical filter bed elements, each comprising a non-matting bed of filter material defining a hollow cylindrical filter bed element having a hollow core, with the filter bed terminating at the walls of a gas inlet duct. The gas inlet duct comprises one or more ducts disposed along at least a portion of the longitudinal length of the cylindrical element with the walls of the duct extending from outside the housing of the separator to the inner circumference of the filter bed.

10 Claims, 5 Drawing Figures

CYLINDRICAL FIBER BED SEPARATOR ELEMENT WITH SIDE-ENTRY INLET DUCT TO CORE OF ELEMENT

BACKGROUND OF THE INVENTION

This invention relates to an improved filter bed separator for separation of liquid or solid particulates from gas streams and/or for washing of accumulated solids from the filter bed. More particularly, it relates to a filter bed separator wherein one or more cylindrical filter bed elements having a hollow core are provided with a gas inlet means for introducing a gas stream to be treated into the hollow core of each cylindrical element such that the gas undergoing treatment flows through the filter material from the hollow core of the cylindrical element radially outwardly.

DESCRIPTION OF THE PRIOR ART

Filter bed, and fiber bed in particular, separators have found widespread use in applications requiring the separation of a liquid phase from a gas stream. In various applications the liquid phase may be a liquid aerosol or mist carried in the gas stream. In other applications, solid or non-flowing liquid particulates are separated from the gas stream, with intermittant or continuous introduction of a flowable liquid into the filter bed or into the gas stream upstream of the filter bed to wash the particulates from the filter bed. the term wash is used herein in a broad sense to include, for example, flushing and dissolving. Wash liquid is introduced by spraying (which term is also used herein in a broad sense to include coarse or fine sprays, fogs or mists introduced into the gas stream or into or onto the filter bed) and may consist of water, a solvent for the collected particulates, or a wash solution such as detergent, etc.

It is known that cylindrical filter bed elements of the type used herein can be designed to function satisfactorily with the gas flowing through the filter bed in either direction desired, i.e., from the hollow core radially outwardly or from the outer circumference radially inwardly to the hollow core. Nevertheless, other process requirements of a given application or installation may make one or the other direction of gas flow through the filter bed preferable or even necessary.

The present invention is directed to those applications where by choice or necessity it is desired that the gas stream flow from the hollow core of the cylindrical element radially outwardly. This direction of gas flow provides a lower space gas velocity on the downstream side of the filter bed than in the hollow core on the upstream side thereof and is particularly desirable in applications where the liquid loading is particularly high, making removal of the collected liquid phase easier and reducing or eliminating any tendency toward reentrainment of the separated liquid phase into the gas stream. Further, it greatly simplifies the equipment and effort required for washing filter beds, and it significantly reduces space requirements for installations.

In the past, to cause the gas stream to enter the hollow core of cylindrical elements for radial flow outwardly through the filter bed, the elements have been mounted with their ends on a tube sheet or similar means whereby the gas enters the hollow core of the cylindrical element at the end thereof. Space requirements, however, may preclude the use of such "end" entry filter bed separators. With vertically disposed cylindrical elements (i.e., where the longitudinal axis of the cylindrical element is disposed substantially vertically), such "end" entry normally requires housing the cylindrical elements in a free-standing vessel with space internally of the vessel for receiving the inlet gases so that the vessel required is appreciably longer than the cylindrical element or elements contained therein.

In copending application, Ser. No. 693,603 filed June 7, 1976, commonly assigned, there is disclosed a novel separator wherein cylindrical elements, packed with a fiber bed, are disposed substantially horizontally. "End" entry of the gas to be treated into such horizontal cylindrical elements again requires that vessel in which the elements are housed be appreciably longer than the elements. The horizontal installations are particularly suited to treatment of restaurant emissions problems where aesthetics are of concern to provide emissions control without creating an unattractive appearance or making unnecessary demands on the limited space available in restaurants.

Moreover, in such installations, practice of this invention significantly reduces the vertical head-room required for installation and use, making further improvements in economy and aesthetics attainable; for example by disposing the filter bed separator in or abutting the particulate containing gas collection hood (as in charbroiler emissions in a restaurant) or delivery duct. The "end" entry filter bed separators of the prior art are not sufficiently compact for such installations.

SUMMARY OF THE INVENTION

The shortcomings of the prior art can be overcome through the provision of a "side" entry gas inlet means whereby the inlet gas flows into the hollow core of the cylindrical element through an elongated duct which extends from outside the housing of the separator into and through the side of the cylindrical element to the hollow core thereof. As used herein the term "side" refers to a zone along the length of the cylindrical element.

It is an object of this invention to provide a filter bed separator for the treatment of gases containing a liquid such as an aerosol or spray using cylindrical filter bed elements having a hollow core with gas inlet means disposed along the side thereof (i.e., along the longitudinal length thereof) communicating with the hoolow core of the cylindrical filter bed element so that the inlet gas is caused to flow through the filter bed from the hollow core side thereof radially outwardly.

Another object is the provision of such a filter bed separator further provided with means for washing the filter bed with a liquid from within the hollow core of the cylindrical element.

These and other objects are attained by a filter bed separator for separation of a liquid from a moving gas stream comprising a housing, inlet means and outlet means for the gas stream, drainage means for the separated liquid phase, at least one cylindrical filter bed element with gas inlet means, and baffle means in conjunction with each cylindrical element to cause the gas stream to flow through the filter bed of the cylindrical element from the hereinafter defined hollow core thereof radially outwardly; wherein each of said at least one cylindrical element with gas inlet means comprises:

(a) a non-matting bed of filter material of thickness defined by an inner and outer circumference, forming a substantially cylindrical filter bed having a hollow core, said filter bed circumferentially terminating at the walls of a gas inlet duct means; and (b) a gas inlet means comprising at least one elongated duct disposed along at least a portion of the longitudinal length of the cylindrical element and the walls of which extend from outside said housing through said housing to the inner circumference of the filter bed.

The length of the gas inlet duct along the longitudinal length of the cylindrical element need only be as long as is necessary or desired for good uniformity of distribution of the inlet gas stream within the hollow core of the cylindrical element. This is a function of the design gas velocity in the core. The higher the core velocity the longer must be the duct in proportion to the length of the cylindrical element. Preferably, the duct will extend along substantially the entire length of the cylindrical element, particularly where a high core velocity, e.g. 20 feet per second or more, is intended. For use with low core velocities, on the other hand, e.g. 5 feed per second or lower, the duct need not, if desired, extend along more than 25% of the length of the element. The optional inclusion of baffles, vanes or other means for diverting gas flow will also enhance gas distribution within the hollow core and further reduce the length of gas inlet duct necessary for proper gas distribution at any given design core velocity. Such gas distribution means may advantageously be disposed within the gas inlet duct. For example, the duct may be divided along its length into two or more compartments by plates across the width of the duct. In addition to providing stiffening support to the duct walls along the length thereof, is disposed at proper angles to the incoming gas flow such plates would divert the gas flow as desired for more uniform distribution of the gas within the hollow core.

In the absence of such diverting means, but advantageously even in the presence thereof, if the gas inlet duct does not extend the entire length of the cylindrical element, it should be centered proximate the mid-point of the length of the element to maximize uniform distribution of the gas within the hollow core.

From the above discussion, it will be apparent that the gas inlet duct need not be continuous along the length of the element. For simplicity, the discussion herein is of a continuous length of duct, but an obvious embodiment of the invention is to divide the duct into a series of two or more smaller ducts, often operating off a common header duct, disposed along the length of the element.

In a further embodiment of the invention, the filter bed separator is further equipped with washing means disposed within the hollow core of each cylindrical element.

The discussion, hereinafter, describes this invention in terms of a single cylindrical element contained in the separator housing, but it will be obvious to those skilled in the art that the invention is not limited thereto, and that two or more "side" entry cylindrical element can be disposed within a separator housing in accordance with the teachings hereof.

For clarity in these drawings, piping shown in side view is not shown in section, and support screens have been omitted from the cylindrical elements.

Figure 4:
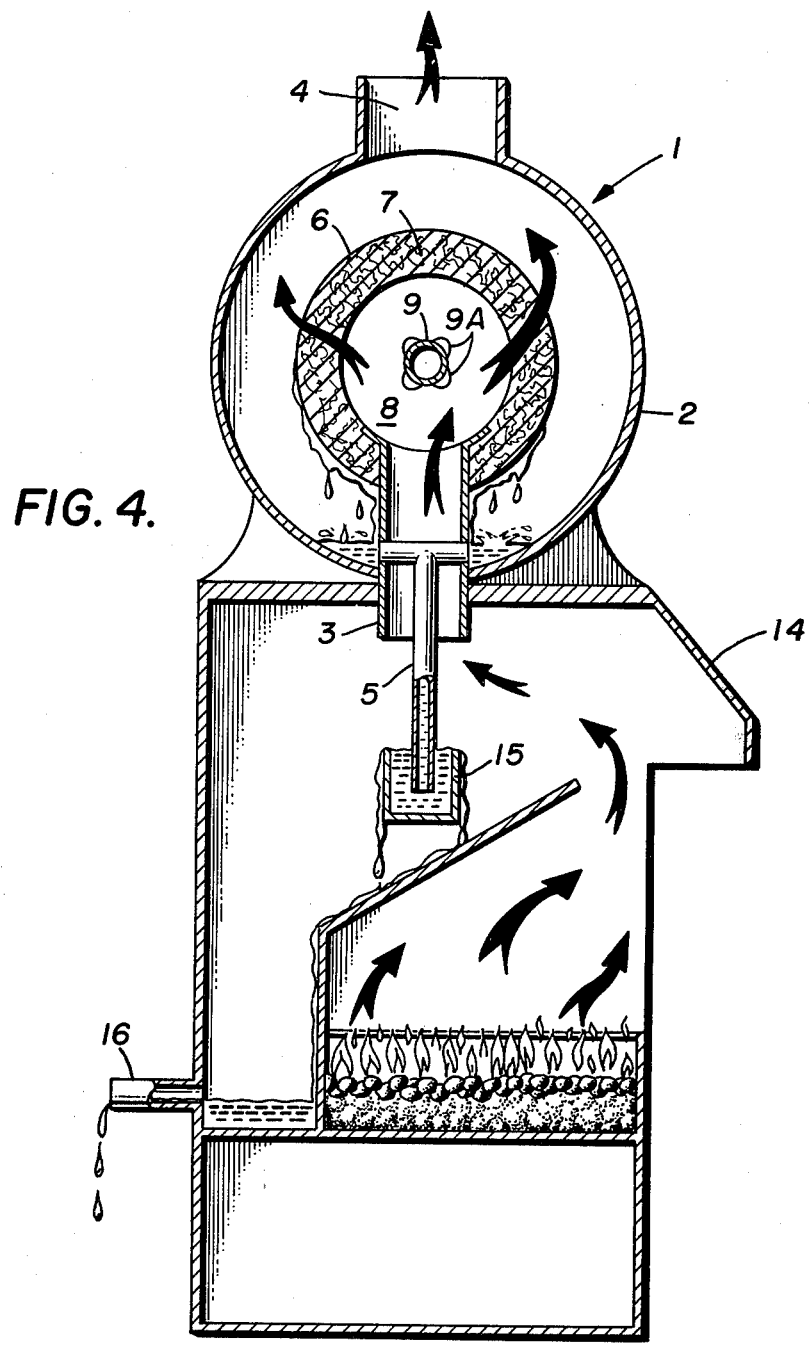

FIG. 4 portrays a typical installation of a separator of this invention within the gas collection hood over a restaurant char-broiler.

DESCRIPTION OF THE PREFERRED EMBODIMENTS

Figure 1:
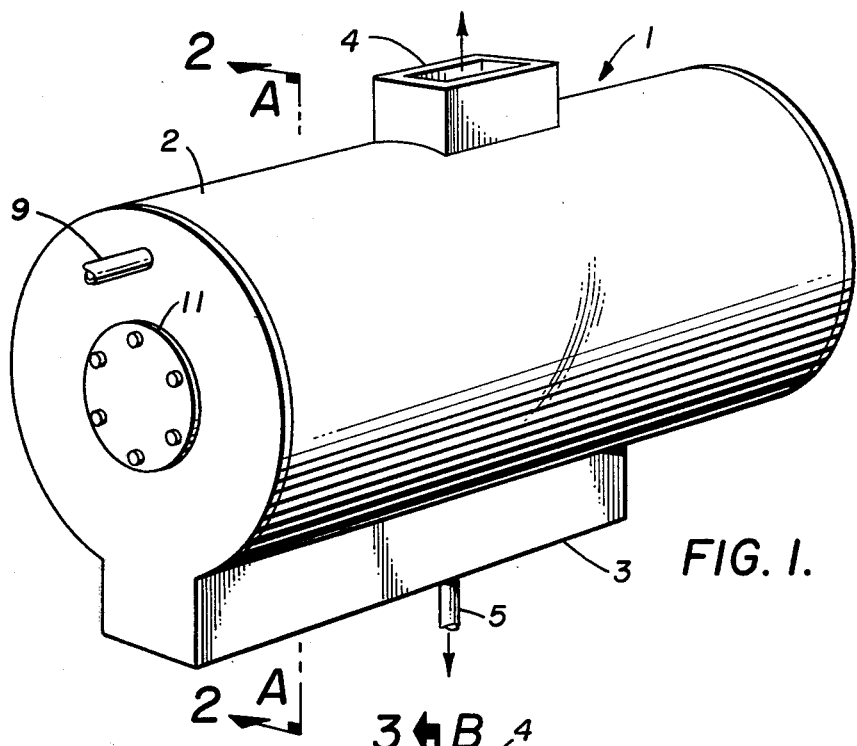
FIG. 1 is a perspective view of one embodiment of filter bed separator (internals not shown) according to this invention.
Figure 2:
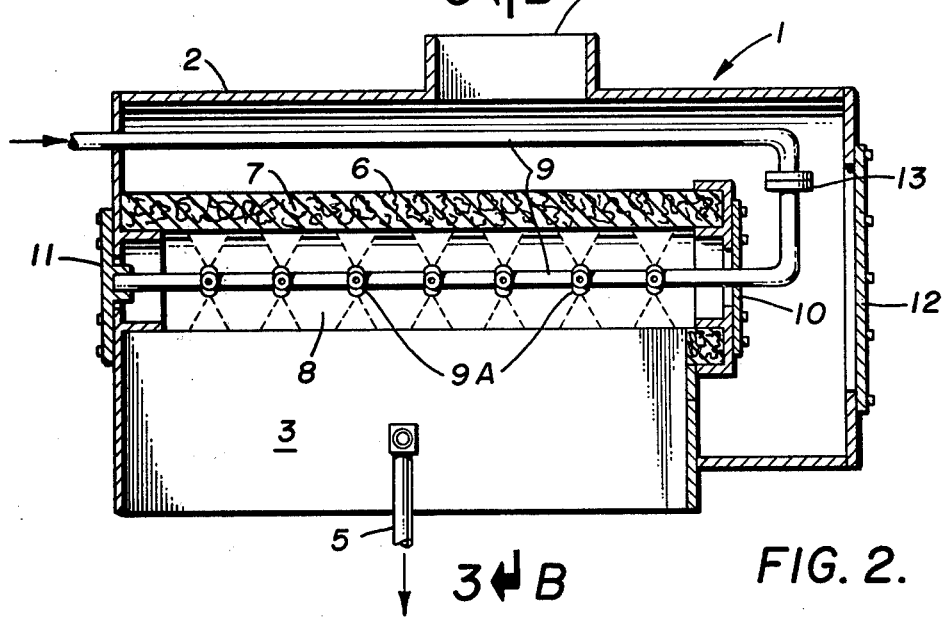
FIG. 2 is a side view of the separator of FIG. 1, taken along section A—A.
Figure 3:
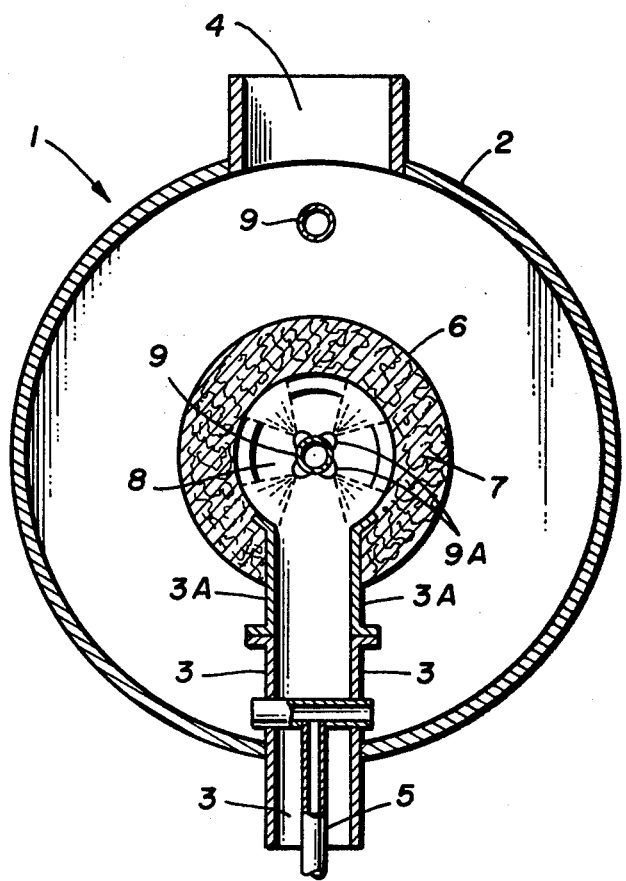
FIG. 3 is essentially an end view of the separator of FIGS. 1 and 2, taken along section B—B, but has been modified as hereinafter set forth to show an optional embodiment of this invention.

FIGS. 1 through 3 portray one embodiment of this invention of a filter bed separator 1 which is particularly suited to installation with the cylindrical element contained therein disposed substantially horizontally along its longitudinal axis.

Filter bed separator 1 is comprised of a housing 2, inlet means 3 and outlet means 4 for the gas stream, drainage means 5 for the separated liquid phase and/or wash liquid, and a cylindrical filter bed element 6 comprised of a bed of filter material 7. If the filter bed is not self supporting suitable support screens, at least for support of the inner surface of the filter bed can be used. The separator may also be optionally provided with washing means shown in FIGS. 2 and 3 as a pipe 9 equipped along the portion of its length which is disposed within hollow core 8 with spray or fogging nozzles (not shown) to uniformly introduce a liquid into the inlet gas or onto the upstream surface of filter bed 7. Removable end plates or covers 10 and 11 cover the ends of the cylindrical element to provide baffle means which preclude the inlet gas from by-passing the filter bed, thus forcing the inlet gas to flow radially outwardly through the filter bed.

Access to pipe 9 and to cylindrical element 6 may conveniently be provided, if desired, in housing 2 by means of a removable cover plate 12.

Gas inlet means 3 comprises an elongated duct whose walls extend from outside housing 2 through the housing all the way to the inner circumference of filter bed 7. A distinct advantage of the present invention is that it makes possible shop fabrication of the entire separator, yet permits the flexibility of shop fabricating only the cylindrical element for field installation in the housing, etc. To enable fabrication and shipping of the side entry cylindrical elements separate from the housing, gas inlet duct 3 can conveniently be formed in two sections as shown in FIG. 3, so that the cylindrical element together with duct section 3a can be shop fabricated and the housing together with duct section 3 can be either shop or field fabricated separately.

If filter bed support screens are used, they, as well as filter bed 7, terminate at the outer walls of the gas inlet duct 3 or 3a with the screens secured thereto by any conventional means such as welding or soldering.

For drainage of the separated liquid phase, drainage means are provided proximate a low point in the housing 2. In horizontal cylindrical element installations, convenient drainage is obtained by disposing gas inlet duct 3 proximate the lower end of the housing 2 and disposing one or more drain pipes 5 within duct 3 (all as shown in the embodiment of FIGS. 2 and 3). Drain pipe 5 communicates by means of a "Tee" through the walls of duct 3 with liquid contained in the bottom of housing 2.

The present invention may use any of the conventional filter materials such as glass, metal, natural or plastic fibers; open cell foams such as reticulated foams; paper or other forms of cellulosic fibers; granular bed; packing materials such as ceramic or glass rings, spheroids or irregular shapes, etc. Particularly preferred, however, are beds of glass, metal or plastic fibers such as are described in U.S. Pat. Nos. 3,540,190; 3,107,986; and 3,135,592; and in copending U.S. application Ser. No. 737,291 filed Nov. 1, 1976, commonly assigned. The filter material should be selected to be resistant to the liquid system used. For example, if paper or cellulosic fibers are used they should advantageously be resin impregnated or treated for, e.g., water resistance.

In those embodiments where it is desired to continuously or periodically irrigate the filter bed or introduce a wash or flush liquid, such as a spray, fog or mist, into the inlet gas, it is advantageous to concentrically dispose a pipe 9 within the hollow core 8 of the cylindrical element, such pipe being advantageously equipped with nozzles along its length within the hollow core 8 placed so as to uniformly distribute the liquid into the inlet gas or onto the inner circumference of filter bed 7. Pipe 9 should be supported by any suitable means at its end which terminates proximate end cover 11. Conveniently this may only be a slip-fit support bracket to facilitate installation and removal of pipe 9. Installation and removal of that portion of pipe 9 within hollow core 8 may also be facilitated by making pipe 9 of two, or more, sections, joined by suitable coupling means such as flange 13.

It has not been found necessary to take any precautions to avoid directing wash liquid into gas inlet duct 3 or 3a, but, if desired, the spray nozzles along pipe 9 may be positioned such that a minimum of wash liquid is directed into the gas inlet duct.

The side entry cylindrical elements of this invention are particularly suited as compact separators for restaurant emissions such as those from char-broilers. A typical installation in conjunction with the hood of a char-broiler is shown in FIG. 4. Separator 1 is shown disposed on top of a conventional collection hood 14 with the gas inlet duct 3 communicating with the upper portion of hood 14 so that gases collected in the hood (i.e., emissions laden air) will flow into the inlet duct. The filter bed 7 can be designed with low enough pressure drop that natural draft will pull the gases through separator 1 and out the gas outlet duct 4, but advantageously an exhaust fan (not shown) or other exhaust means may be used to insure a steady flow of the gases from the collection hood and through the system.

Char-broiler installations normally will require only periodic washing of the filter bed to remove accumulated particulates, fats and greases. As shown in FIG. 4, the separator 1 is in its wash cycle. If desired, it may continue to treat the char-broiler gases during the wash cycle, or alternatively washing may be scheduled for after closing of the restaurant. A suitable wash liquid is sprayed from pipe 9 onto the inner surface of filter bed 7. The dirty wash liquid flows from the outer surface of filter bed 7, down to the bottom of housing 2 where it flows into drain pipe 5. The discharge end of drain pipe 5 terminates in a means for preventing gases from flowing into the pipe such as a seal pot 15. Dirty wash liquid overflows seal pot 15, finally draining out of the system through drain 16.

The space velocity of the gases within a char-broiler collection hood 14 is not normally sufficient to entrain the wash liquid in the gases. However, for hoods operating at a relatively high space velocity, for example, certain industrial applications, care should be taken to discharge the liquid at a point within the hood of sufficiently low space velocity that entrainment is not likely, or alternatively drain pipe 15 can extend to a point outside of the hood rather than terminate within the hood. It should be noted that any entrainment would be separated in filter bed 7 in any event, but would unnecessarily add to the particulate loading the filter bed must handle.

Thus far this invention has been described in terms of cylindrical elements disposed substantially horizontally along their longitudinal axis and with the gas inlet duct disposed at the bottom of the housing. It will be obvious to those skilled in the art that practice of this invention is not limited in either regard.

In fact, the side entry cylindrical elements and separators of this invention are suitable for installation and operation at any desired angle with respect to their longitudinal axis. It is only necessary that the gas inlet duct 3 be in communication with a source of gas requiring treatment. For example, a separator of this invention can be secured to the side or roof of a building or other structure with the gas inlet duct communicating through the wall thereof with a gas source such as ceiling ducts carrying air or any process gas stream containing particulates which require separation. Such installations require a minimum of hardware and present a small profile lying close against the side or roof of the structure so as to be as unobtrusive as possible.

Similarly, in horizontal installations, the gas inlet duct need not necessarily be at the bottom of the separator, but may be at the top, or side, or at any angle. Nor need it be a straight duct as shown in FIGS. 2 and 3.

In any of these installations it is only necessary to locate the liquid drainage means proximate the bottom of the housing 2 so that the separated liquid phase or wash liquid can be drained without undesirable build-up within the housing.

The foregoing description of the several embodiments of this invention is not intended as limiting of the invention. As will be apparent to those skilled in the art, the inventive concept set forth herein can find many applications in the art of filter bed separators and many variations on and modifications to the embodiments described above many be made without departing from the spirit and scope of this invention.

What is claimed is:

1. A filter bed separator for separation of a liquid from a moving gas stream, said separator comprising a housing having inlet and outlet means for the gas stream and drainage means for the separated liquid phase, and disposed within said housing at least one cylindrical fiber bed element with gas inlet duct means in communication with said inlet means of said housing, and baffle means in conjunction with each of said at least one cylindrical element to cause the gas stream to flow through the filter bed of each of said at least one cylindrical element from the hereinafter defined hollow core thereof radially outwardly; each of said at least one cylindrical element with gas inlet duct means comprising:

(a) a non-matting bed of filter material of thickness defined by an inner and outer circumference, forming a substantially cylindrical filter bed having a hollow core, said filter bed circumferentially terminating at the walls of said gas inlet duct means; and (b) said gas inlet duct means comprising at least one elongated duct disposed along at least a substantial portion of the longitudinal length of the cylindrical element and the walls of which extend from at least said housing inlet means to the inner circumference of the filter bed.

2. A filter bed separator as in claim 1 further having a means for irrigating or washing the filter bed disposed within the hollow core of each of said at least one cylindrical element.

3. A filter bed separator as in claim 2 wherein said irrigating or washing means is a pipe provided with a plurality of spray nozzles disposed so as to provide substantially uniform distribution of the liquid over the inner surface of the filter bed.

4. A filter bed separator as in claim 1 wherein the filter bed is a bed of glass, metal or plastic fibers.

5. A filter bed separator as in claim 1 wherein the walls of each of said at least one duct extend from outside said housing through said housing to the inner circumference of the filter bed.

6. A filter bed separator as in claim 1 wherein said at least one cylindrical element comprises a single cylindrical filter bed element with gas inlet duct means and disposed within said housing.

7. A filter bed separator as in claim 6 further having a means for irrigating or washing the filter bed disposed within the hollow core of said single cylindrical element.

8. A filter bed separator as in claim 7 wherein said irrigating or washing means is a pipe provided with a plurality of spray nozzles disposed so as to provide substantially uniform distribution of the liquid over the inner surface of the filter bed.

9. A cylindrical filter bed element for use in a filter bed separator for separation of a liquid from a moving gas stream comprising a non-mating bed of filter material of thickness defined by an inner and outer circumference, forming a cylindrical filter bed having a hollow core, said filter bed circumferentially terminating at the walls of a gas inlet duct means; said gas inlet duct means comprising at least one duct disposed along at least a substantial portion of the longitudinal length of said cylindrical element and the walls of which extend at least from the outer circumference of the filter bed to the inner circumference thereof.

10. a cylindrical filter bed element as in claim 9 wherein the filter bed is a bed of glass, metal or plastic fibers.

* * * * *